US011589298B2

(12) United States Patent
Sapra et al.

(10) Patent No.: US 11,589,298 B2
(45) Date of Patent: Feb. 21, 2023

(54) METHODS, SYSTEMS, AND COMPUTER READABLE MEDIA FOR SELECTING MULTIPLE NETWORK FUNCTION TYPES USING A SINGLE DISCOVERY REQUEST

(71) Applicant: Oracle International Corporation, Redwood Shores, CA (US)

(72) Inventors: Kawal Sapra, Bangalore (IN); Venkatesh Aravamudhan, Bangalore (IN); Doki Satish Kumar Patro, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/193,337

(22) Filed: Mar. 5, 2021

(65) Prior Publication Data

US 2022/0286949 A1    Sep. 8, 2022

(51) Int. Cl.
*H04W 48/18* (2009.01)
*H04W 48/16* (2009.01)

(52) U.S. Cl.
CPC ........... *H04W 48/18* (2013.01); *H04W 48/16* (2013.01)

(58) Field of Classification Search
CPC .................................................... H04W 48/18
See application file for complete search history.

(56) References Cited

U.S. PATENT DOCUMENTS

| | | | |
|---|---|---|---|
| 10,637,753 B1 | 4/2020 | Taft et al. | |
| 10,772,062 B1 * | 9/2020 | Albasheir | H04W 48/16 |
| 11,290,549 B2 * | 3/2022 | Krishan | H04L 67/51 |
| 11,438,828 B2 | 9/2022 | Sapra et al. | |
| 2006/0010224 A1 | 1/2006 | Sekar et al. | |
| 2009/0222584 A1 | 9/2009 | Josefsberg et al. | |
| 2013/0198269 A1 | 8/2013 | Fleischman et al. | |

(Continued)

FOREIGN PATENT DOCUMENTS

| | | |
|---|---|---|
| WO | WO 2019/193129 A1 | 10/2019 |
| WO | WO 2022/025988 A1 | 2/2022 |

(Continued)

OTHER PUBLICATIONS

"3rd Generation Partnership Project; Technical Specification Group Core Network and Terminals; 5G System; Network Function Repository Services; Stage 3 (Release 17)," 3GPP TS 29.510, V17.0.0, pp. 1-245 (Dec. 2020).

(Continued)

*Primary Examiner* — Qutbuddin Ghulamali
(74) *Attorney, Agent, or Firm* — Jenkins, Wilson, Taylor & Hunt, P.A.

(57) ABSTRACT

A method for selecting multiple network function (NF) types using a single discovery request includes receiving, by a NF repository function (NRF) from a consumer NF, a single discovery request message that requests discovery of a plurality of producer NF types in a fifth generation (5G) core network and includes an indication of multiple NF discovery requests, obtaining, by the NRF, NF profile objects corresponding to each of the plurality of producer NF types included in the single discovery request message, and providing, to the consumer NF via a single discovery response message generated by the NRF, NF profile objects that correspond to one or more of the plurality of producer NF types.

20 Claims, 6 Drawing Sheets

(56) References Cited

U.S. PATENT DOCUMENTS

| | | | |
|---|---|---|---|
| 2013/0272123 | A1 | 10/2013 | Lee |
| 2015/0119101 | A1* | 4/2015 | Cui ..................... H04W 48/18 |
| | | | 455/525 |
| 2016/0380906 | A1 | 12/2016 | Hodique et al. |
| 2018/0262625 | A1 | 9/2018 | McCarley et al. |
| 2019/0230556 | A1* | 7/2019 | Lee ..................... H04W 28/16 |
| 2019/0357216 | A1 | 11/2019 | Jung et al. |
| 2019/0370028 | A1* | 12/2019 | Shi ........................... G06F 8/10 |
| 2020/0137174 | A1* | 4/2020 | Stammers ............ H04L 67/141 |
| 2020/0404608 | A1* | 12/2020 | Albasheir ............ H04W 60/00 |
| 2021/0007023 | A1 | 1/2021 | Umapathy et al. |
| 2021/0044481 | A1* | 2/2021 | Xu ....................... H04W 72/02 |
| 2021/0385286 | A1 | 12/2021 | Wang et al. |
| 2022/0015023 | A1* | 1/2022 | De-Gregorio-Rodriguez ............ |
| | | | H04L 67/51 |
| 2022/0038999 | A1 | 2/2022 | Sapra et al. |
| 2022/0060547 | A1* | 2/2022 | Krishan ................. H04L 67/56 |
| 2022/0070648 | A1* | 3/2022 | Krishan ................. H04L 67/51 |
| 2022/0240171 | A1 | 7/2022 | Singh |

FOREIGN PATENT DOCUMENTS

| | | |
|---|---|---|
| WO | WO 2022/046170 A1 | 3/2022 |
| WO | WO 2022/050987 A1 | 3/2022 |

OTHER PUBLICATIONS

Notification of Transmittal of the International Search Report and the Written Opinion of the International Searching Authority, or the Declaration for U.S. Patent Application Serial No. PCT/US2021/020122 (dated Jun. 1, 2021).

Notification of Transmittal of the International Search Report and the Written Opinion of the International Searching Authority, or the Declaration for U.S. Patent Application Serial No. PCT/US2021/020121 (dated Jun. 1, 2021).

Notice of Allowance and Fee(s) Due for U.S. Appl. No. 17/001,599 (dated May 17, 2021).

Applicant-Initiated Interview Summary for U.S. Appl. No. 17/001,599 (dated May 5, 2021).

"3rd Generation Partnership Project; Technical Specification Group Services and System Aspects; Procedures for the 5G System (5GS); Stage 2 (Release 16)," 3GPP TS 23.502, V16.7.0, pp. 1-603 (dated Dec. 2020).

"3rd Generation Partnership Project; Technical Specification Group Services and System Aspects; System architecture for the 5G System (5GS); Stage 2 (Release 16)," 3GPP TS 23.501, V16.7.0, pp. 1-450 (dated Dec. 2020).

"3rd Generation Partnership Project; Technical Specification Group Core Network and Terminals; 5G System; Technical Realization of Service Based Architecture; Stage 3 (Release 17)," 3GPP TS 29.500, V17.1.0, pp. 1-90 (dated Dec. 2020).

Commonly-Assigned, co-pending U.S. Appl. No. 17/009,725 for "Methods, Systems, and Computer Readable Media for Service Communications Proxy (SCP)—Specific Prioritized Network Function (NF) Discovery and Routing," (Unpublished, filed Sep. 1, 2020).

Commonly-Assigned, co-pending U.S. Appl. No. 17/001,599 for "Methods, Systems, and Computer Readable Media for Optimized Network Function (NF) Discovery and Routing Using Service Communications Proxy (SCP) and NF Repository Function (NRF)," (Unpublished, filed Aug. 24, 2020).

"3rd Generation Partnership Project; Technical Specification Group Services and System Aspects; System architecture for the 5G System (5GS); Stage 2 (Release 16)," 3GPP TS 23.501 V16.5.1, pp. 1-440 (Aug. 2020).

Commonly-Assigned, co-pending U.S. Appl. No. 16/942,713 for "Methods, Systems, and Computer Readable Media for Providing Network Function Discovery Service Enhancements," (Unpublished, filed Jul. 29, 2020).

"3rd Generation Partnership Project; Technical Specification Group Core Network and Terminals; 5G System; Network Function Repository Services; Stage 3 (Release 16)," 3GPP TS 29.510 V16.4.0, pp. 1-192 (Jul. 2020).

"3rd Generation Partnership Project; Technical Specification Group Core Network and Terminals; 5G System; Technical Realization of Service Based Architecture; Stage 3 (Release 16)," 3GPP TS 29.500 V16.4.0 pp. 1-79 (Jun. 2020).

"3rd Generation Partnership Project; Technical Specification Group Services and System Aspects; Procedures for the 5G System (5GS); Stage 2," 3GPP TS 23.502 V16.4.0 pp. 1-582 (Mar. 2020).

"3rd Generation Partnership Project; Technical Specification Group Core Network and Terminals; 5G System; Network Function Repository Services; Stage 3 (Release 16)," 3GPP TS 29.510, V16.0.0, pp. 1-135 (Jun. 2019).

Huawei, "eSBA: reselection of producer instance," 3GPP TSG-SA2 Meeting #132, pp. 1-2 (Apr. 12, 2019).

Docomo, "Update Solution 4 for implicit registration," SA WG2 Meeting #129, pp. 1-2 (Oct. 15-19, 2018).

Notice of Allowance and Fee(s) Due for U.S. Appl. No. 17/009,725 (dated Jun. 13, 2022).

Commonly-assigned, co-pending U.S. Appl. No. 17/392,228 for "Methods, Systems, and Computer Readable Media for Optimized Routing of Service Based Interface (SBI) Request Messages to Remote Network Function (NF) Repository Functions Using Indirect Communications via Service Communications Proxy (SCP)," (Unpublished, filed Aug. 3, 2021).

"3rd Generation Partnership Project; Technical Specification Group Core Network and Terminals; 5G System; Network Function Repository Services; Stage 3 (Release 17)," 3GPP TSG 29.510, V17.5.0, pp. 1-298 (Mar. 2022).

Notice of Allowance for U.S. Appl. No. 17/156,149 (dated May 24, 2022).

Notice of Allowance for U.S. Appl. No. 17/156,149 (dated Apr. 19, 2022).

Commonly-assigned, co-pending U.S. Appl. No. 17/551,124 for "Methods, Systems, and Computer Readable Media for Enabling Forwarding of Subsequent Network Function Subscription Updates," (Unpublished, filed Dec. 14, 2021).

Notice of Allowance for U.S. Appl. No. 16/942,713 (dated Nov. 29, 2021).

Notice of Allowance for U.S. Appl. No. 17/001,599 (dated Nov. 17, 2021).

Ex Parte Quayle Action for U.S. Appl. No. 16/942,713 (dated Sep. 13, 2021).

\* cited by examiner

502 — /nnrf-disc/v1/nf-instances?requester-nf-type=AMF&target-nf-type=PCF&snssais={"sd":"4ebaaa","sst":3}  ⎫ 501
504 — CustomHeader:- MultipleDiscoveryRequests: UDM, PCF, AUSF, SMF  ⎭

506 — /nnrf-disc/v1/nf-instances?requester-nf-type=AMF&target-nf-type=PCF&target-plmn-list=["mcc":"410","mnc":"05"}  ⎫ 505
508 — CustomHeader:- MultipleDiscoveryRequests : UDM, PCF, AUSF, SMF  ⎭

510 — CustomHeader:-MultipleDiscoveryResponses: true  ⎫
512 — [{"nfInstanceId":"13515195-c537-4645-9b97-96ec797fbbbf","nfType":"AUSF","nfStatus":"REGISTERED" ...}, {"nfInstanceid":"23515195-c537-4645-9b97-96ec797fbbbf","nfType":"SMF","nfStatus":"REGISTERED" ...}, {"nfInstanceId":"3351515-c537-4645-9b97-96ec797fbbbf","nfType":"PCF","nfStatus":"REGISTERED" ...}, {"nfInstanceid":"43515195-c537-4645-9b97-96ec797fbbbf","nfType":"UDM","nfStatus":"REGISTERED" ...}]  ⎭ 509

METHODS, SYSTEMS, AND COMPUTER READABLE MEDIA FOR SELECTING MULTIPLE NETWORK FUNCTION TYPES USING A SINGLE DISCOVERY REQUEST

TECHNICAL FIELD

The subject matter described herein relates to improving the network function (NF) service discovery operations in communications networks. More particularly, the subject matter described herein relates to methods, systems, and computer readable media for selecting multiple network function types using a single discovery request.

BACKGROUND

In fifth generation (5G) telecommunications networks, the network node that provides service is referred to as a producer network function (NF). A network node that consumes services is referred to as a consumer NF. Moreover, a network function can operate as both a producer NF and a consumer NF depending on whether it is consuming or providing service.

A given producer NF may have many service endpoints, where a service endpoint is a combination of an Internet protocol (IP) address and a port number on a network node that hosts a producer NF. Producer NFs register with a network function repository function (NRF). The NRF maintains a NF profile of available NF instances and their supported services. Consumer NFs can subscribe with the NRF to receive information about producer NF instances that have registered with that NRF.

At present, the 3GPP architecture supports a NF discovery service operation (i.e., 'NFDiscover' messaging) that enables consumer NFs to discover the producer NFs from the NRF. Specifically, the NRF stores producer NF profiles (e.g., NF profile objects) and provides the NF profiles to requesting consumer NFs upon receiving NF discovery request messages. Further, it is assumed that 5G network deployments can span multiple public land mobile network (PLMN) sites, slices (e.g., logical network slices), and/or localities. Network functions can register themselves in different NRFs that are located in different PLMNs or network slices. In the event a NF discovery service operation is requested, the serving NRF will return NF profiles (e.g., producer NF profile objects) that correspond to a single producer NF type (e.g., an AUSF type, UDM type, PCF type, etc.). Notably, the current 3GPP specification does not provide a means for the consumer NF to request NF profiles corresponding to multiple producer NF profile types via a single NFdiscovery request message. More specifically, the current 3GPP architecture provides a mechanism to discover only one producer NF target type using a single query.

Accordingly, there exists a need for methods, systems, and computer readable media for selecting multiple network function types using a single discovery request.

SUMMARY

Methods, systems, and computer readable media for selecting multiple network function (NF) types using a single discovery request are disclosed. One method for selecting multiple network function types using a single discovery request includes receiving, by a NF repository function (NRF) from a consumer NF, a single discovery request message that requests discovery of a plurality of producer NF types in a fifth generation (5G) core network and includes an indication of multiple NF discovery requests, obtaining, by the NRF, NF profile objects corresponding to each of the plurality of producer NF types included in the single discovery request message, and providing, to the consumer NF via a single discovery response message generated by the NRF, NF profile objects that correspond to one or more of the plurality of producer NF types.

According to another aspect of the subject matter described herein, a method that further includes a single discovery response message that includes an indication of multiple NF discovery responses.

According to another aspect of the subject matter described herein, a method that further includes the indication includes a listing of the plurality of NF types in a custom header of the single discovery request message.

According to another aspect of the subject matter described herein, a method that further includes a single discovery request message that includes a search uniform resource identifier (URI) portion that contains a listing of the plurality of NF types.

According to another aspect of the subject matter described herein, a method wherein the single discovery request message further includes a plurality of search attributes.

According to another aspect of the subject matter described herein, a method wherein the plurality of search attributes define at least one of a target public land mobile network (PLMN), a target network slice, or a preferred locality.

According to another aspect of the subject matter described herein, a method wherein the indication of multiple NF discovery requests is included in a search URI portion of the single discovery request message.

A system for selecting multiple network function types using a single discovery request includes a NRF that is stored in memory and when executed by a processor is configured to receive function from a consumer NF a single discovery request message that requests discovery of a plurality of producer NF types in 5G core network and includes an indication of multiple NF discovery requests, to obtain NF profile objects corresponding to each of the plurality of producer NF types included in the single discovery request message, and to provide, to the consumer NF via a single discovery response message generated by the NRF, NF profile object.

According to another aspect of the subject matter described herein, a method that further includes a single discovery response message that includes an indication of multiple NF discovery responses.

According to another aspect of the subject matter described herein, a system that further includes the indication includes a listing of the plurality of NF types in a custom header of the single discovery request message.

According to another aspect of the subject matter described herein, a system that further includes a single discovery request message that includes a search URI portion that contains a listing of the plurality of NF types.

According to another aspect of the subject matter described herein, a system wherein the single discovery request message further includes a plurality of search attributes.

According to another aspect of the subject matter described herein, a system wherein the plurality of search attributes define at least one of a target PLMN, a target network slice, or a preferred locality.

According to another aspect of the subject matter described herein, a system wherein the indication of multiple NF discovery requests is included in a search URI portion of the single discovery request message.

The subject matter described herein may be implemented in hardware, software, firmware, or any combination thereof. As such, the terms "function" "node", "engine" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
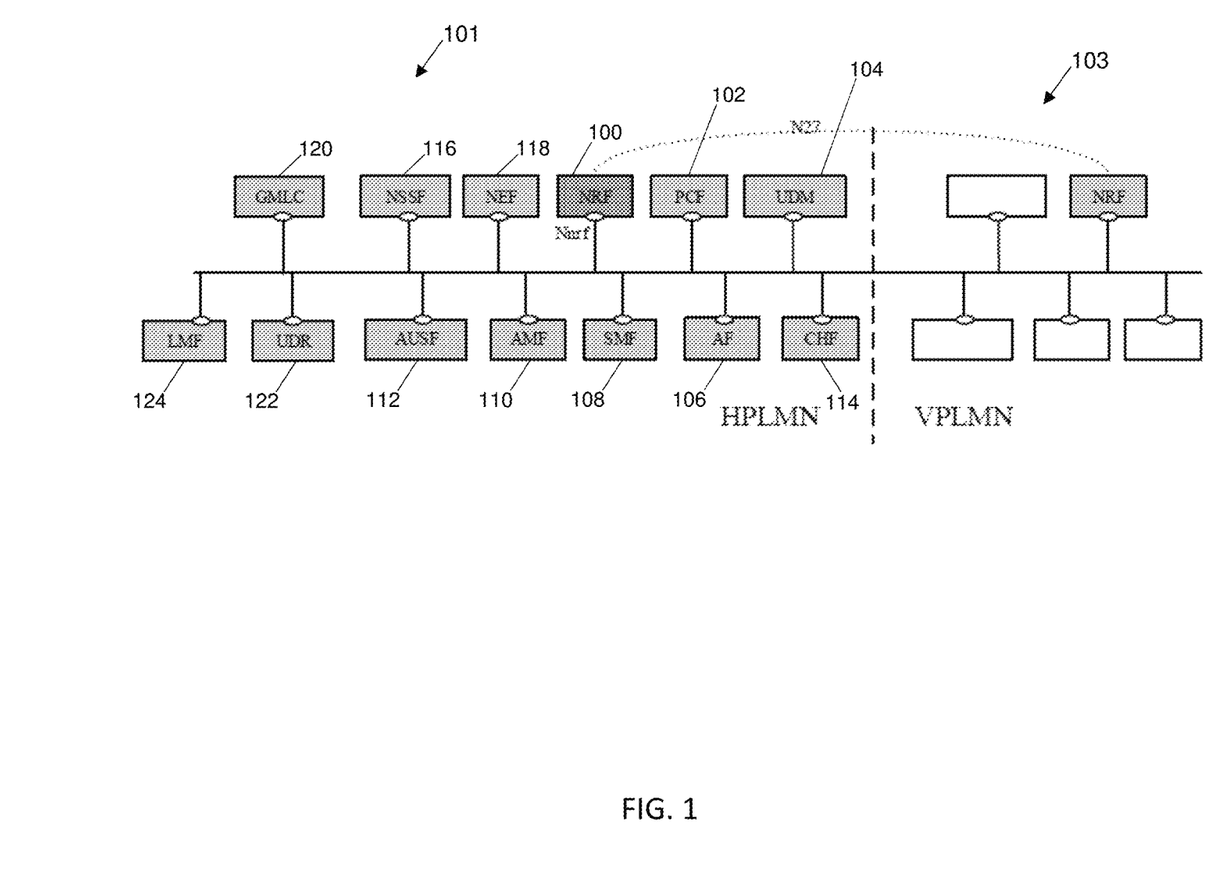
FIG. 1 is a network diagram illustrating an exemplary system architecture of a 5G core network according to an embodiment of the subject matter described herein.

The subject matter described herein relates to methods, systems, and computer readable media for selecting multiple network function types using a single discovery request. As used herein, the single discovery request may include any single 3rd Generation Partnership Project (3GPP)-based discovery request message including, but not limited to, a single NFdiscovery request message, a single service discovery request message, a single 'NF service discovery' request message, a single NFdiscover message, or a similar single message that is configured to discover multiple network functions in the manner described below. FIG. 1 is a block diagram illustrating an exemplary system network architecture corresponding to a 5G core network. The architecture in FIG. 1 includes NF repository function (NRF) 100, which may be located in a home public land mobile network (HPLMN). As described above, NRF 100 may maintain NF profiles of available producer NF service instances and their supported services. NRF 100 may also allow consumer NFs to subscribe to and be notified of the registration of new and/or updated producer NF service instances. As used herein, a NF profile may include a profile object containing the general parameters of the NF instance (e.g., a consumer NF or producer NF) in addition to the parameters of the different services exposed or supported by the NF instance. In some embodiments, the NF profile object is a JavaScript object notation (JSON) data structure defined in 3GPP TS 29.510, Technical Specification Group Core Network and Terminals; 5G System; Network Function Repository Services; Stage 3 (Release 16) V16.0.0 (2019-06). For example, the NF profile definition may include at least one of a fully qualified domain name (FQDN), an Internet protocol (IP) version 4 (IPv4) address or an IP version 6 (IPv6) address. Notably, the requesting consumer NF can use the acquired address information to establish a communication channel with a particular producer NF.

NRF 100 may also support service discovery and selection of producer NFs. Notably, NRF 100 can be configured to receive NFdiscovery requests from consumer NF instances and subsequently provide the information of the available NF instances that satisfy certain criteria (e.g., support of a given service). As previously indicated, current 3GPP architecture affords a NF Discover mechanism that enables consumer NFs (i.e., NF service consumers, source NFs, etc.) to only discover a single producer NF type (i.e., NF service producers, target NFs, etc.) from the NRF for each single discovery request message. For example, if an initial registration or protocol data unit (PDU) session establishment use case requires the AMF to select each of an authentication server function (AUSF) NF, a unified data management (UDM) NF, a session management function (SMF) NF, and a policy control function (PCF) NF, the current 3GPP specification requires that a corresponding equal number of discovery request messages (e.g., four separate messages) are sent to NRF 100. More specifically, there is no option under the present 3GPP standards in which a consumer NF can request or discover multiple producer NF types using a single NFdiscovery request message.

In contrast, the disclosed subject matter allows consumer NFs (or source NFs) to discover and/or request multiple producer NF types (or target NF types) by permitting consumer NF to send a single NFdiscovery request message that includes an indication of "Multiple Discovery Requests". Specifically, a consumer network function can indicate its ability to support the discovery of multiple producer network functions within a given network slice (e.g., single-network slice selection assistance information (S-NSSAI) parameter), PLMN, and/or preferred locality. As such, the NRF receiving the single discovery request should be configured to provide the multiple network function profiles as requested by the original consumer network function. In some embodiments, the single NFdiscovery request message includes an indication or notation (e.g., "multiple_discovery_requests") in a customized header portion of the discovery request message. In addition, the indication may also include a list of producer network function types (e.g., NF target type) in the custom header portion (e.g., {list(NFType}) for which the network function profiles are sought. Moreover, existing NF discover search attributes (e.g., such as target S-NSSAI, target PLMN, and/or preferred locality) can also be used to granulize and/or restrict the NF profiles ultimately returned to the requesting consumer NF. In some embodiments the search attributes are included in the header portion of the discovery request message.

In response to receiving the NF discovery request, the NRF can be configured to search and detect the indication in the request message. Locating the indication compels the NRF to inspect the NF discovery request message further (e.g., inspect the customized header portion) and determine the requested NF profile types. Notably, NRF 100 can obtain one or more appropriate network function profiles for each of the requested producer network function types that belong to the network slice, PLMN, and/or preferred locality specified in the discovery request message. Moreover, the NRF subsequently generates a single NFdiscovery response message that contains the acquired network function profile objects and includes an indication or notation of "multiple_discovery_responses" in the discovery response message. More specifically, the discovery response message can include a custom header portion that contains an indication, notation, or flag that specifically informs the consumer network function that the response message contains multiple producer network function profiles for the plurality of requested NF target types.

If the consumer network function does not support the behavior or capability indicated above, then the consumer network function will not add a custom header in the network function discovery service request message. Similarly, if the consumer network function sends a discovery request message that includes an indication in the custom header as described herein but the receiving NRF 100 is not configured to support this feature, then NRF 100 will not return a discovery response message that includes the custom header with the indication or notation indicating that the response message includes multiple discovery responses.

As indicated above, NRF 100 can be configured to return, in response to a multiple NF discovery request message, a single NFdiscovery response message that includes an indication of "multiple discovery responses" (e.g., in the custom header portion). By adding the indication in the custom header portion (or the search query URI portion), NRF 100 is permitted to indicate its ability to support the 'multiple NF Discovery requests' functionality. In the event where NRF 100 does not support this functionality, NRF 100 will not add a custom header in the NF discovery service response message. The body portion of the discovery response message further includes NF profiles belonging to each of the NF types requested by the original consumer NF. In addition, the NF profile objects corresponding to the different NF types can be further restricted to a unique PLMN, network slice, and/or locality as previously specified in the request message sent by the consumer NF.

Returning to FIG. 1, any of the nodes (other than NRF 100) can be either consumer NFs or producer NFs, depending on whether they are requesting or providing services. In the illustrated example, the nodes include a policy control function (PCF) 102 that performs policy related operations in a network, a user data management (UDM) function 104 that manages user data, and an application function (AF) 106 that provides application services. The nodes illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user equipment (UE) that seek access to the 5G core network (e.g., via a radio access network).

FIG. 1 further illustrates a network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. In some embodiments, NEF 118 performs similar functions to the service capability exposure function (SCEF) in 4G networks.

Figure 2:
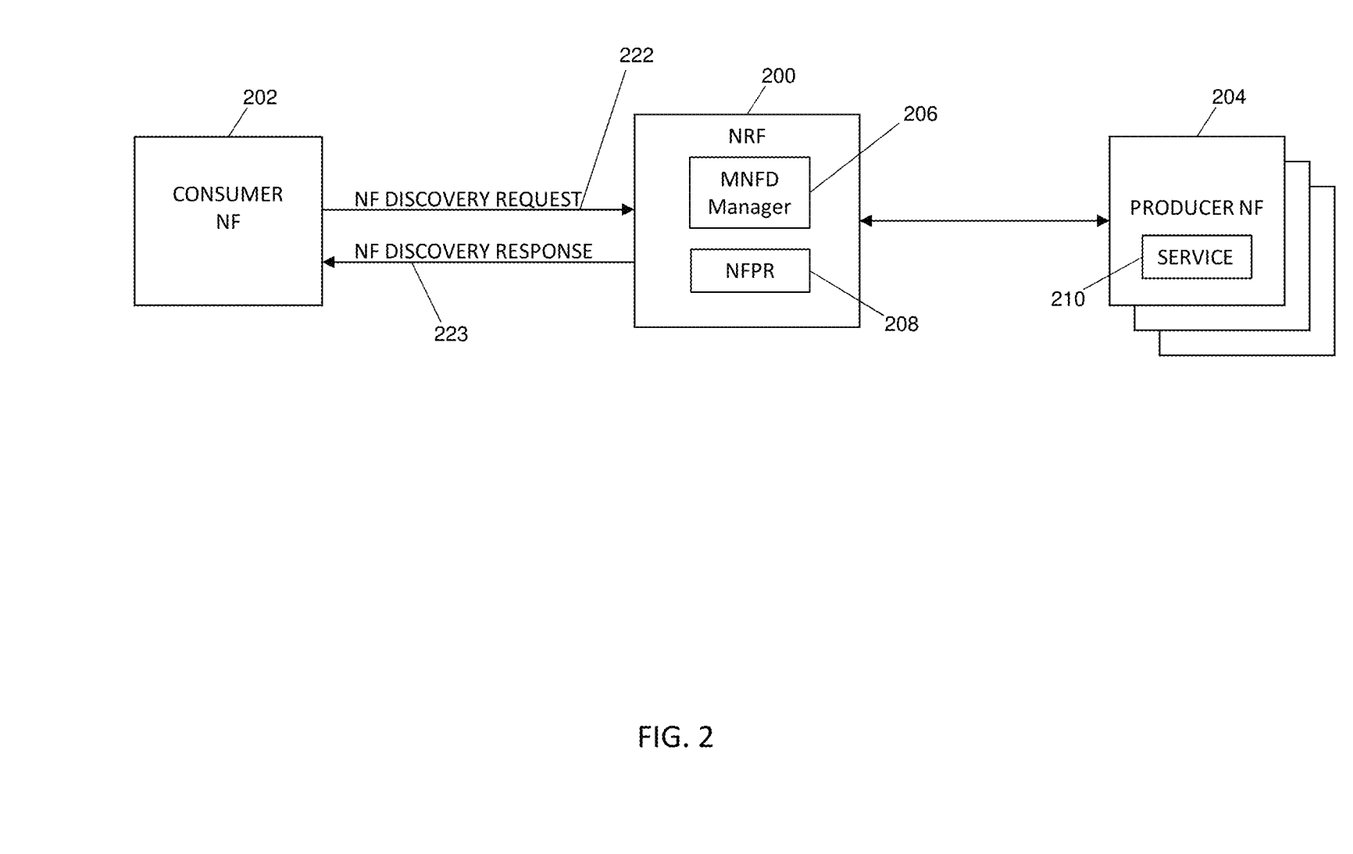
FIG. 2 is a block diagram illustrating 5G network functions communicatively connected to a NRF node according to an embodiment of the subject matter described herein.

FIG. 2 is a block diagram illustrating 5G network functions connected to an NRF node according to an embodiment of the subject matter described herein. In some embodiments, each of the consumer NF 202 and producer NFs 204 is configured to conduct an initial NF registration service operation with NRF 200. For example, producer NF 240 can send a NF register message (not shown) to NRF 200 that indicates the producer NF's provided network service 210, PLMN, network slice (if applicable), locality, and other NF specific information. NRF 200 may be configured to store the NF registration information as NF profile objects in a local NF profile repository (NFPR) 208.

As shown in FIG. 2, NRF 200 is also configured to host a Multiple Network Function Discovery (MNFD) manager 206. In some embodiments, the MNFD manager may include a software algorithm that is stored in memory and executed by a processor of a computing device (e.g., a NRF). As indicated above, MNFD manager 206 is configured to utilize NFPR 208 as storage for maintaining NF profiles of available producer NF instances and their respective supported services. In some embodiments, a producer NF can register its NF profile and/or network services 210 with NRF 200. The MNFD manager 206 and/or NRF 200 can then store the NF profile of the registered producer NF in NFPR 208. Notably, in order to communicate with a producer NF, a consumer NF (or source NF) must obtain the corresponding NF profile from NRF 200.

Once registered with NRF 200, consumer NF 202 may subsequently send a NF discovery request message 222 to NRF 200 in order to register for protocol data unit (PDU) session establishment. In particular, consumer NF 202 can send a single NFdiscovery request message that requests discovery of a plurality of producer NF types. Notably, the single NF discover request message includes an indication or notation (e.g., a "multiple NF discovery requests" tag) in a customized header portion of the message. In some embodiments, the NF discovery request message comprises an HTTP GET request message that is sent by the NF service consumer to the NRF.

Each of the producer NF types (e.g., producer NFs 204) can provide a particular network service (e.g., network service 210) in a specified PLMN, network slice, and/or locality. In addition to indicating a plurality of NF types, the single NFdiscovery request message 222 also includes search attributes pertaining to one or more PLMNs, network slices, and/or localities. As such, consumer NF 202 (or source NF) can utilize these search attributes parameters to restrict the plurality of NF profile objects that the consumer NF will receive in a single NFdiscovery response message 223 from NRF 200 to NF profile objects that only correspond to a specific PLMN, network slice, and/or preferred locality.

In some embodiments, for example, the consumer NF can send to the NRF a NF discovery request message 222 that contains the "multiple NF discovery requests" indication along with a listing of the plurality of NF target types the consumer NF would like to discover. The single discovery request message may further include one or more defined search attributes. More specifically, the single NFdiscovery service request message can include a specified PLMN designation or a network slice designation. In addition, the request message 222 can include a preferred locality designation. Notably, these search attribute parameters can be included in a custom header portion of the NF discovery request message that is sent to the NRF. After receiving the NF discovery request message, the NRF can be configured to utilize MNFD manager 206 to execute a 'multiple NFDiscover requests service' operation procedure that obtains the relevant producer NF profiles corresponding to the plurality of different producer NF types (as indicated in the NF discovery request message) that host or expose a desired network service.

In some embodiments, MNFD manager 206 is configured to detect the indication (i.e., "multiple_NF_discovery_requests") in the custom header portion of the received NF discovery request message 222. In response to detecting the indication in the single NFdiscovery request message 222 from consumer NF 202, NRF 200 initiates the NF discovery procedure in order to obtain the relevant NF profiles of different target or producer NFs (i.e., producer NFs that provide the network service requested by the consumer NF in the discovery request message 222). For example, NRF 200 can execute the NF discovery procedure described in the TS 29.510 specification. More specifically, the MNFD manager 206 is configured to identify the plurality of NF profile types contained in the custom header portion of the received NF discovery request message. In some embodiments, the MNFD manager 206 can extract or parse a list that indicates the multiple NF profile types in the custom header of the request message. In addition, the MNFD manager 206 may also be responsible for obtaining search attribute data from the header of the multiple discovery request message 222.

Afterwards, the NRF and/or MNFD manager 206 retrieves, for each of the indicated NF target types, one or more NF profiles that comply with the search attributes. For example, the MNFD manager can generate a listing, for each of the plurality of NF profile types requested, of NF profiles that correspond to the PLMN, network slice, and/or locality specified in the NF discovery request message 222. In some embodiments, the MNFD manager 206 can obtain the NF profiles from the NFPR 208 that contains NF profile objects of registered producer network functions.

Once all of the appropriate NF profiles are obtained for each of the requested NF target types, the NRF 200 may generate and return a discovery response message 223 to the consumer NF 202. In some embodiments, message 223 may include an HTTP OK message. The response body of the discovery response message may specify a plurality or array of NF profile objects corresponding to producer NFs that satisfy the requested NF target types and search attribute criteria (e.g., PLMN, slice, and/or locality) indicated in the original NF Discovery request message.

Further, NRF 200 may also be configured to insert an indication in the discovery response message 223. More specifically, after acquiring all the relevant NF profiles for each of the requested NF profiles types, the MDR engine 206 may configure the NF discovery response message to include a "multiple discovery responses" indication or notation that indicates that the NRF 200 supports the multiple NF discovery responses feature and that the response message contains NF profile objects for each of the plurality of requested NF types.

Figure 3:
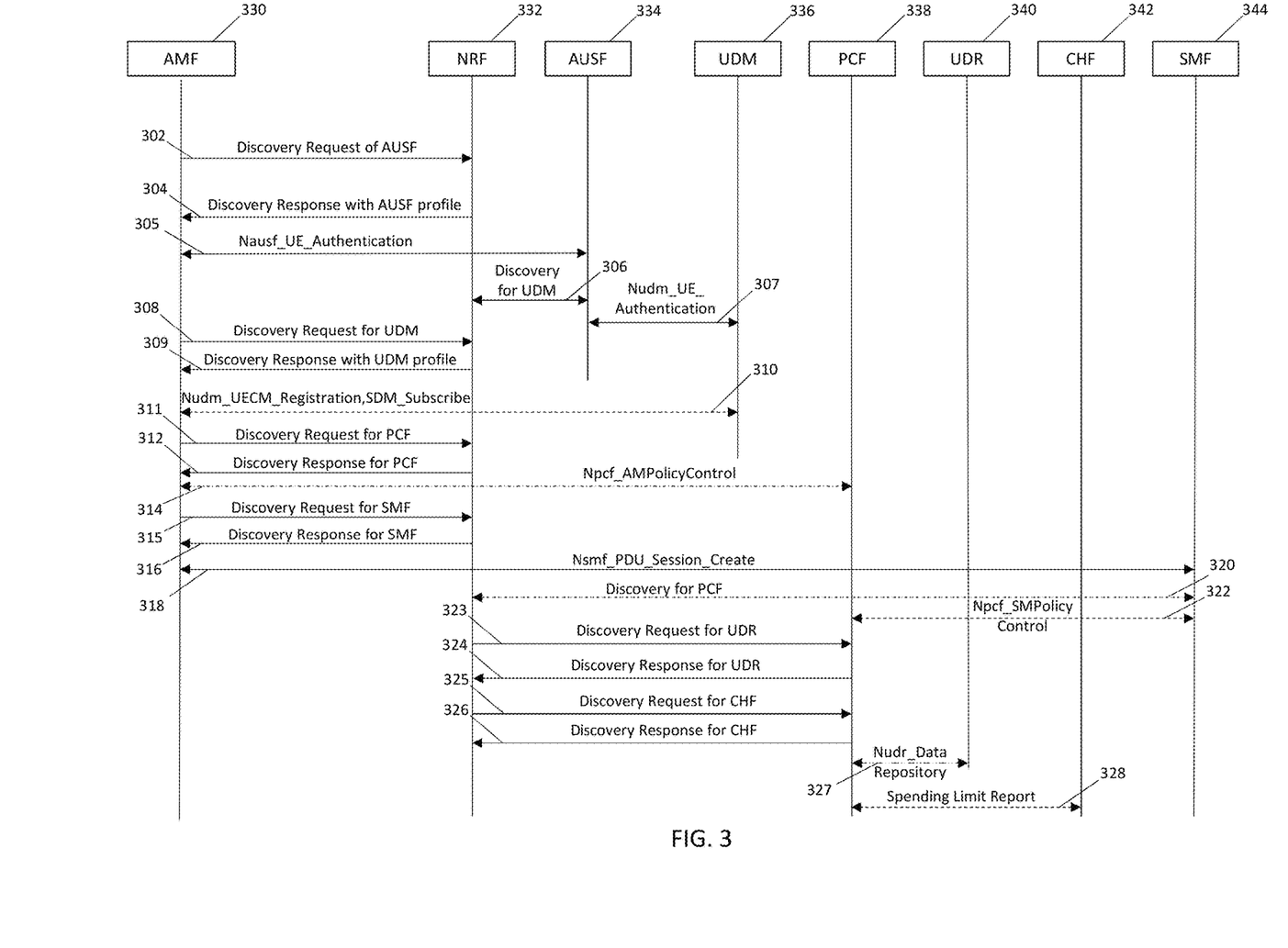
FIG. 3 illustrates a NF discovery request signaling diagram utilizing a plurality of separate NF discovery request messages.

FIG. 3 illustrates an NF discovery request signaling diagram in accordance with present 3GPP standards. As shown in FIG. 3, AMF 330 (i.e., consumer NF) requires the discovery of a plurality of producer network functions in order to successfully register for protocol data unit (PDU) session establishment. In this example, AMF 330 requires the NF profile information for each of AUSF 334, UDM 336, SMF 344, and PCF 338. In order to obtain this profile information per the current 3GPP guidelines, AMF 330 will generate and send two or more separate discovery request messages to NRF 332. For example, FIG. 3 illustrates a first discovery request message 302 sent to NRF 332 that requests profile information pertaining to an AUSF (e.g., AUSF 334) and a second discovery request message 308 sent to NRF 332 that requests profile information pertaining to a UDM (e.g., UDM 336). Notably, each of these separate request messages receive a corresponding and separate response message (e.g., discovery response messages 304 and 309, respectively). Each discovery response message contains the NF profile information requested in the previously sent corresponding request message. FIG. 3 further illustrates a third discovery request message 311 sent to NRF 332 that requests profile information pertaining to an PCF (e.g., PCF 338) and a fourth discovery request message 315 sent to NRF 332 that requests profile information pertaining to an SMF (e.g., SMF 344). Notably, each of these separate request messages receive a corresponding and separate response message (e.g., discovery response messages 312 and 316, respectively). Each discovery response message contains the NF profile information requested in the previously sent corresponding request message.

Similarly, NRF 332 may be required to send a separate NF discovery request message to obtain profile information for each of UDR 340 and CHF 342. More specifically, NRF 332 sends a third NF discovery message 323 to request UDR profile information (which is subsequently provided via a discovery response message 324) and a fourth NF discovery message 325 to request CHF profile information (which is subsequently provided via a discovery response message 326). Notably, multiple NF discovery request messages are needed to obtain NF producer profile information for each different NF target type.

Figure 4:
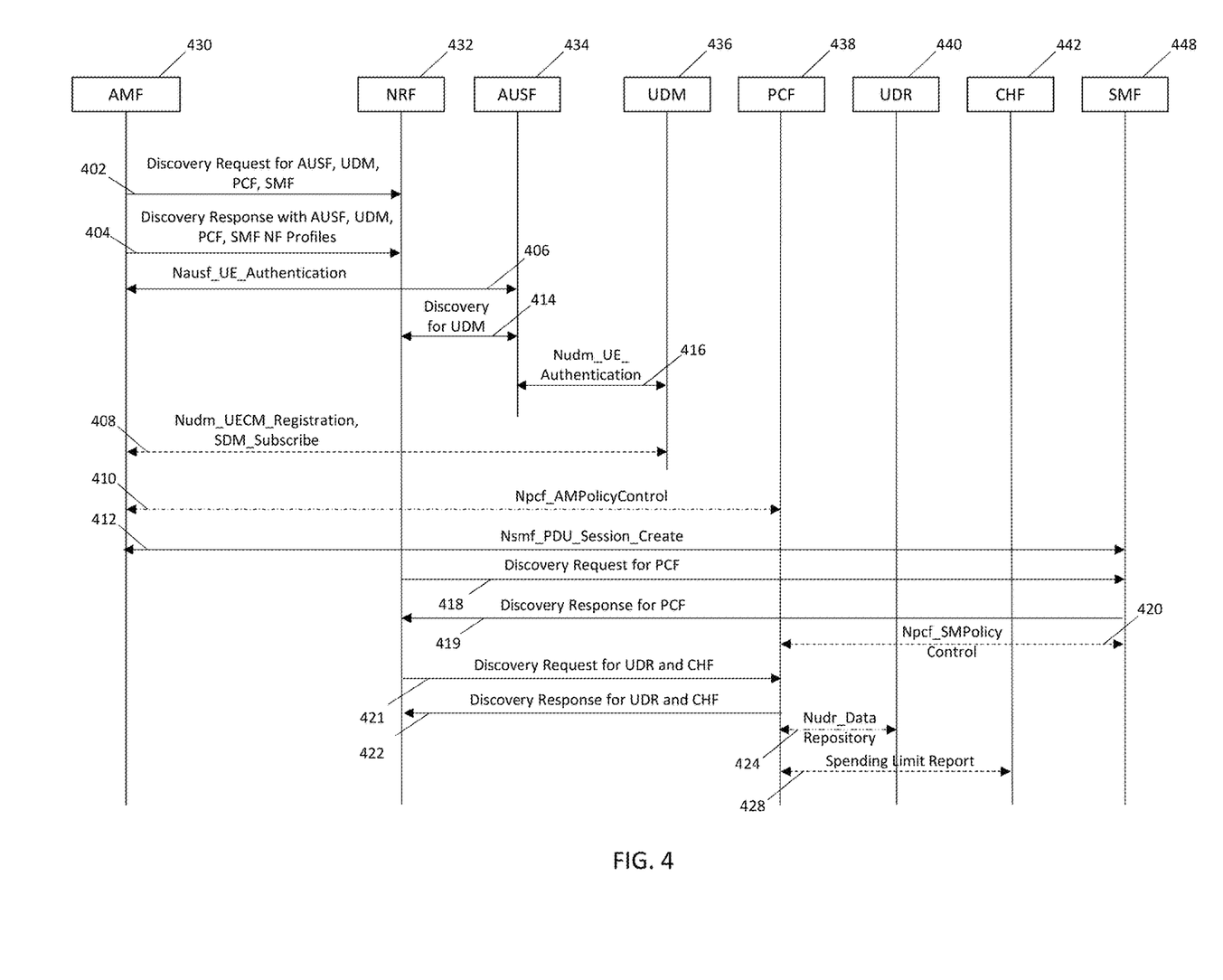
FIG. 4 illustrates an exemplary NF discovery request signaling diagram depicting the selection of multiple network function types via a single request according to an embodiment of the subject matter described herein.

In contrast, the disclosed subject matter enables a network entity to request and obtain multiple NF target types using a single NFdiscovery request message. FIG. 4 illustrates an exemplary NF discovery request signaling diagram depicting the selection of multiple network function types via a single request according to an embodiment of the subject matter described herein. As shown in FIG. 4, a single NFdiscovery request message 402 is sent to NRF 432. Notably, request message 402 includes a customized header portion that includes an indication or notation that multiple NF discovery requests are being made. Specifically, the customized header portion includes a listing of a plurality of producer network function types, such as the AUSF, UDM, PCF, and SMF. In some embodiments, discovery request message 402 can also include search attributes associated with a specified PLMN, network slice, and/or preferred locality.

After receiving request message 402, NRF 432 (and/or a local MNFD manager) is configured to search for the "multiple NF discovery requests" indication in the custom header portion of the single request message 402. Upon detecting the indication in the custom header portion, NRF 432 may be configured to inspect request message 402 for the list of multiple producer network function types that is being requested by AMF 430 (e.g., consumer NF). After identifying the list of multiple producer network function types, NRF 432 is configured to obtain NF profile information for each of the requested NF types. For example, NRF 432 detects a list in the custom header portion of request message 402 that specifies AUSF, UDM, PCF, and SMF network function types. Accordingly, NRF 432 is configured to obtain NF profile information for each of the AUSF, UDM, PCF, and SMF. In some embodiments, NRF 432 is also configured to obtain search attribute information from request message 402. In particular, request message 402 can include PLMN, network slice, and/or preferred locality restrictions set forth by the requesting AMF 430. In some embodiments, these search attributes may be specified in the header portion of the request message 402.

NRF 432 (and/or its MNFD manager) may be further configured to access a NF profile repository that contains NF profile information pertaining to all producer network functions that have registered with the NRF 200. NRF 432 may obtain from the repository, for each NF target type, a plurality of NF profiles or NF profile objects that comply with the search attributes (if applicable) specified in the request message 402. Afterwards, NRF 432 (and/or its MNFD manager) may generate a single NFdiscovery response message 404 that contains the plurality of NF profile information (e.g., NF profile objects included in the body portion of the response message 404). In addition, NRF 432 (and/or its MNFD manager) may insert an indication or notation in the single NFdiscovery response message 404 that indicates "multiple NF discovery responses". This indication serves two purposes. First, the indication provides notice to the receiving customer network function to search the body of the response message for multiple NF profiles that correspond to the requested plurality of NF types. Second, the indication further indicates that the NRF 432 is configured to process the "multiple NF discovery requests" operation and has attempted to locate the multiple network function profiles as requested. This indication is particularly useful to inform consumer network functions of scenarios where the NRF was unable to locate multiple network function profiles even though the NRF attempted to do so.

Comparing the signaling flow of FIG. 4 to the signaling flow of FIG. 3, one can see that it is advantageous to send a single NFdiscovery request message 402 that contains a plurality of NF types as opposed to a plurality of separate NF discovery request messages for each of these same NF types. In particular, the number of request and response messages communicated between AMF 330 and NRF 332 can be significantly reduced. Such an advantage is also evident in the communication of NF discovery messages between NRF 432 and PCF 438. In particular, NRF 432 utilizes a single NFdiscovery request message 421 to request NF profile information for each of a UDR and CHF NF type. In contrast, NRF 332 in FIG. 3 utilized two separate discovery request messages to obtain the same information.

Figure 5:
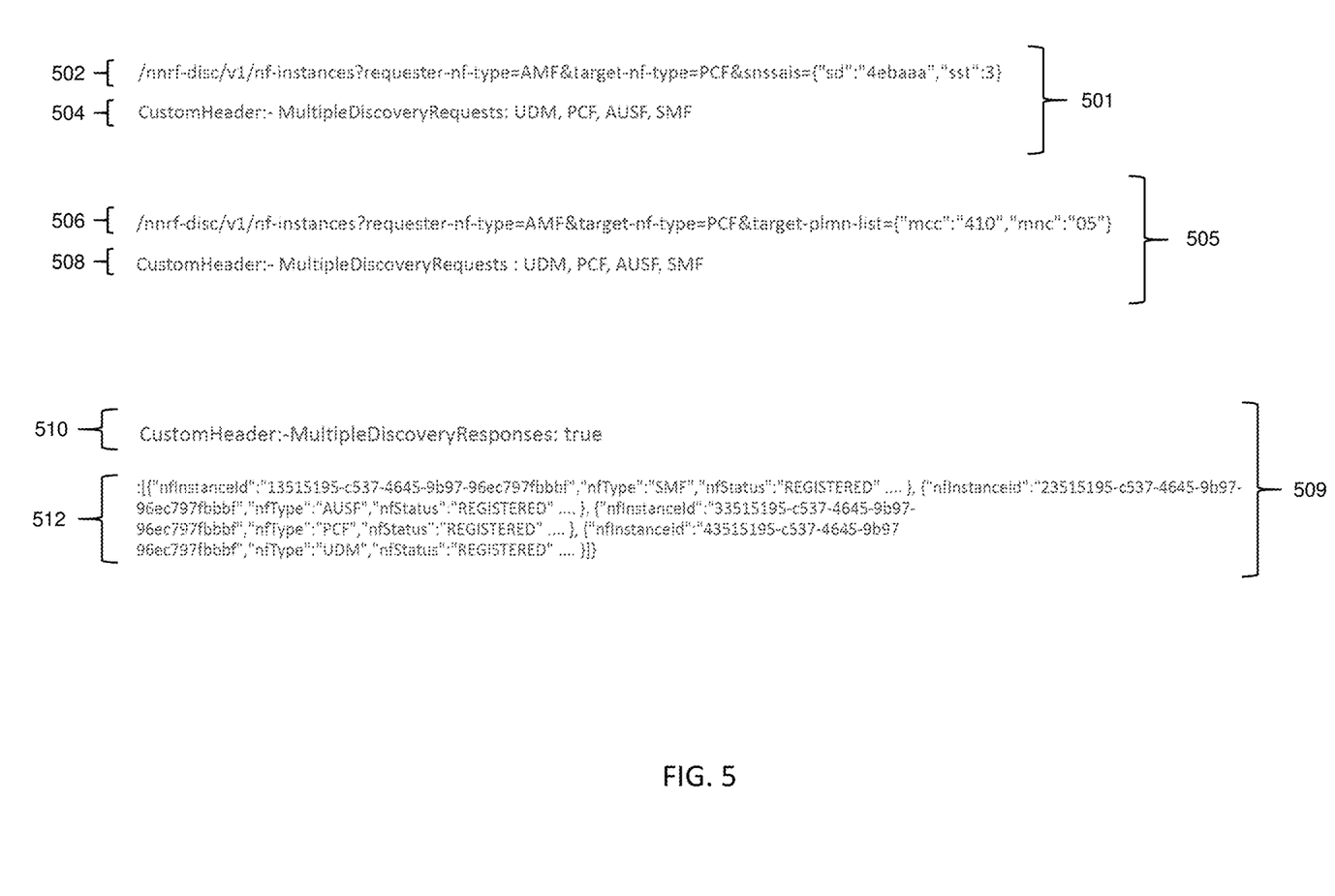
FIG. 5 illustrates exemplary contents of a consumer NF discovery request message according to an embodiment of the subject matter described herein.

FIG. 5 illustrates exemplary contents of a consumer NF discovery request message according to an embodiment of the subject matter described herein. In particular, FIG. 5 shows a plurality of different NF discovery request and response messages. For example, message portion 502 includes a search query URI of an HTTP discovery request message 501. Notably, message portion 502 indicates an AMF consumer NF that is requesting NF profile information pertaining to PCFs associated with particular network slice (e.g., network slice identified by SD=4ebaaa and SST=3). NF discovery request message 501 further includes a custom header portion 504 that contains an indication of a "MultipleDiscoveryRequests" feature. In addition, custom header portion 504 contains a corresponding listing of a plurality of NF types, including a UDM NF type, a PCF NF type, an AUSF NF type, and SMF NF type.

Likewise, message portion 506 also includes a search query URI of an HTTP discovery request message 505. Notably, message portion 506 indicates an AMF consumer NF that is requesting NF profile information pertaining to PCFs associated with particular PLMN (e.g., MCC=410 and MNC=05). In particular, message portion 506 can be used to list each specific PLMN by its MCC identifier and MNC identifier. The MCC and MNC identifiers are used by the requesting consumer NF to indicate the specific PLMN(s) containing NF profiles corresponding to the network services that the consumer NF (or source NF) is interested.

Similarly, this message portion can also include single-network slice selection assistance information (S-NSSAI) parameter (as mentioned above in custom header portion 504). Notably, the S-NSSAI includes two components: a SST parameter and a SD parameter. The SST parameter identifies a slice/service type and the SD parameter identifies the slice differentiator. Likewise, the SST and SD parameters are used by the requesting consumer NF to specify the specific network slice(s) that the consumer NF is interested in receiving NF profiles. Likewise, this message section can also contain a preferred locality parameter. In some embodiments, the preferred locality parameter may include an identifier of a logical locality that a network operator has established and defined. Notably, the preferred locality can be logically defined as an area-based or region-based locality. Similar to the PLMN and S-NSSAI parameters, the preferred locality parameter can be added to a producer NF profile when that producer NF is registered with the NRF.

NF discovery request message 505 further includes a custom header portion 508 that contains an indication of a "MultipleDiscoveryRequests" feature. In addition, custom header portion 508 contains a corresponding listing of a plurality of NF types, including a UDM NF type, a PCF NF type, an AUSF NF type, and SMF NF type.

Although FIG. 4 illustrates the custom header portion (e.g., portion 504 and portion 508) as the message portion containing the "MultipleDiscoveryRequests" indication and NF type listing, this indication information may be communicated to the NRF in other portions of the discover request message. For example, the "MultipleDiscoveryRequests" indication and/or NF type listing may be included and/or incorporated in the search query URI portion of the discovery request message.

FIG. 5 also illustrates an NF discovery response message 509 that may be generated by an NRF in response to receiving an NF discovery request message 501 or 505. In some embodiments, discovery response message 509 is an HTTP response message generated by the NRF. Notably, message portion 510 is a customer header portion of the discovery response message 509 and includes an indication that the "MultipleDiscoveryRequests" feature is indeed supported by the sending entity (e.g., the NRF). NF discovery response message 509 further includes body portion 512 that contains a plurality of NF profiles. Specifically, body portion 512 contains a listing of a NF profiles that correspond to a plurality of NF types (i.e., a plurality of UDM NF profiles, a plurality of PCF NF profiles, a plurality of AUSF NF profiles, and a plurality of SMF NF profiles). In some embodiments, the listing of NF profiles comply with the search attributes indicated (if any) in the original NF discovery request message received by the NRF.

Figure 6:
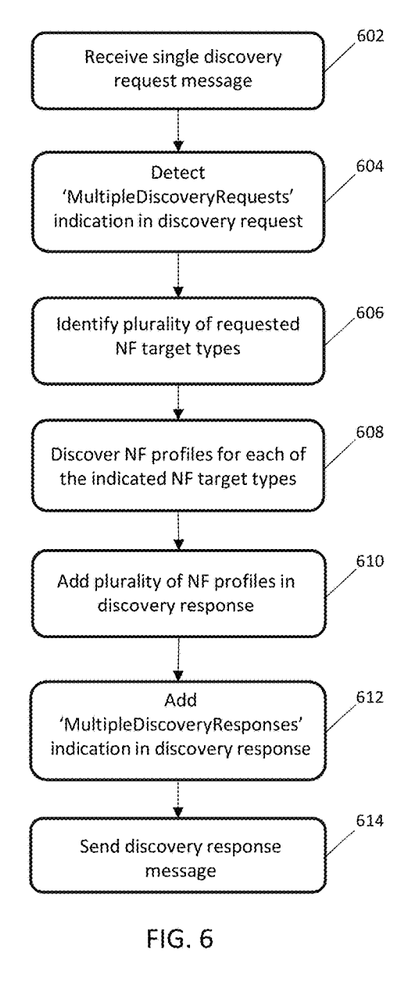
FIG. 6 is a flow chart illustrating an exemplary method for selecting multiple network function types using a single NFdiscovery request according to an embodiment of the subject matter described herein.

FIG. 6 is a flow chart illustrating an exemplary method 600 for selecting multiple network function types using a single discovery request according to an embodiment of the subject matter described herein. In some embodiments, method 600 includes an algorithm and/or software process (e.g., a MNFD manager) that is stored in memory of an NRF and subsequently executed by one or more hardware processors of the NRF (or a hardware based network element hosting and/or supporting the NRF). In block 602, a single NFdiscovery request message is received. In some embodiments, a NF discovery request message is received by a NRF from a consumer NF requesting discovery of a plurality of producer NF types. In some embodiments, the NF discover request message may contain search attributes that require the requested NF types to be located in a particular PLMN and/or network slice that are hosting or exposing a network service that is of interest to the consumer NF. More specifically, the single NFdiscovery request message serves as a request directed to a local NRF by a consumer NF to discover network services that are offered by a plurality of NF instances in the 5G core network. In some embodiments, the single NFdiscovery request message is an HTTP GET message. In some embodiments of the disclosed subject matter the NF discovery request message can include a custom header portion that includes an indication or notation that indicates the request and/or support of a "MultipleDiscoveryRequests" feature.

In block 604, the NRF detects the "MultipleDiscoveryRequests" indication in the request message. In some embodiments, the NRF is configured to detect the indication in either a custom header portion or the search query URI portion of the received NF discovery request message.

In block 606, the plurality of request NF target types is identified. Notably, in response to detecting the "MultipleDiscoveryRequests" indication, the NRF is configured to inspect the discovery request message for a listing of NF target types requested by the consumer NF. In some embodiments, the listing of requested NF types is included in the customer header portion or the search query URI portion of the received NF discovery request message.

In block 608, NF profiles for each of the indicated NF target types is discovered. In some embodiments, the NRF executes the NF discovery service operation. In some embodiments, the NRF is configured to execute the NFDiscover procedure specified in the TS29.510 standard in order to obtain NF profiles corresponding to each of the producer NF types that provides the network services requested by the consumer NF in block 602. In some embodiments, the NRF accesses a NF profile repository containing a list of NF profiles corresponding to producer NFs that have previously registered with the NRF. More specifically, the NRF accesses the NF profile repository to acquire all NF profile objects associated with producer NFs that host, expose, and/or support the network service requested by the consumer NF in the single NFdiscovery request message received in block 602. In some embodiments, the NF profile objects obtained from the NF profile repository conform with the search attributes set forth in the NF discovery request message.

In block 610, the plurality of NF profiles are added to a discovery response message. In some embodiments, the NRF will then generate a NF discovery response message that includes a number of NF profiles (e.g., obtained in block 608) that pertain to the plurality of NF target types specified in the consumer NF's original discovery request message criteria. The NF profiles provided in the response message will also comply to the search attribute features (e.g., PLMN, network slice, and/or preferred locality) specified in the original discovery request message originally sent to the NRF.

In block 612, an indication of "MultipleDiscoveryResponses" is added to the single NFdiscovery response message. In some embodiments, an indication or notation that indicates the presence of multiple discovery responses in the single NFdiscovery response message is added by the NRF. In some embodiments, this indication is included in a custom header portion of the single NFdiscovery response message In block 614, the single discovery response message including the NF profiles is sent. Notably, the NF discovery response message generated in block 610 is sent by the NRF to the consumer NF in response to the original received NF discovery request message (e.g., the single discovery request message received in block 602).

It should be noted that each of the NRF, the MNFD manager, and/or functionality described herein may constitute a special purpose computing device. Further, the NRF, the MNFD manager, and/or functionality described herein can improve the technological field of 5G communications among network functions. Specifically, the disclosed subject matter is able to reduce the control plane latency for use cases that pertain to attachment procedures, PDU connectivity, and the like. Furthermore, the disclosed subject matter provides efficient usage of single discovery requests for retrieving multiple network function profiles that effectively reduces NF TPS requirements. Notably, lesser TPS requirements from NFS may consequently reduce hardware requirements. Moreover, the benefits presented by the disclosed subject matter increased multi-fold when NF discovery operations are performed across WAN links in situations where the consumer network functions are located a substantial distance away from an NRF.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for selecting multiple network function (NF) types using a single discovery request, the method comprising:
   receiving, by a NF repository function (NRF) from a consumer NF, a single discovery request message that requests discovery of a plurality of producer NF types in a fifth generation (5G) core network and includes an indication of multiple NF discovery requests;
   obtaining, by the NRF, NF profile objects corresponding to each of the plurality of producer NF types included in the single discovery request message; and
   providing, to the consumer NF via a single discovery response message generated by the NRF, NF profile objects that correspond to one or more of the plurality of producer NF types.

2. The method of claim 1 wherein the single discovery response message includes an indication of multiple NF discovery responses.

3. The method of claim 1 wherein the indication includes a listing of the plurality of NF types in a custom header of the single discovery request message.

4. The method of claim 1 wherein the single discovery request message includes a search uniform resource identifier (URI) portion that contains a listing of the plurality of NF types.

5. The method of claim 1 wherein the single discovery request message further includes a plurality of search attributes.

6. The method of claim 5 wherein the plurality of search attributes define at least one of a target public land mobile network (PLMN), a target network slice, or a preferred locality.

7. The method of claim 1 wherein the indication of multiple NF discovery requests is included in a search uniform resource identifier (URI) portion of the single discovery request message.

8. A system for selecting multiple network function (NF) types using a single discovery request, the system comprising:
 a NF repository function (NRF) including at least one processor and a memory;
 a Multiple Network Function Discovery (MNFD) manager implemented by the at least one processor that is configured to receive function from a consumer NF a single discovery request message that requests discovery of a plurality of producer NF types in a fifth generation (5G) core network and includes an indication of multiple NF discovery requests, to obtain NF profile objects corresponding to each of the plurality of producer NF types included in the single discovery request message, and to provide, to the consumer NF via a single discovery response message generated by the NRF, NF profile objects that correspond to one or more of the plurality of producer NF types.

9. The system of claim 8 wherein the single discovery response message includes an indication of multiple NF discovery responses.

10. The system of claim 8 wherein the indication includes a listing of the plurality of NF types in a custom header of the single discovery request message.

11. The system of claim 8 wherein the single discovery request message includes a search uniform resource identifier (URI) portion that contains a listing of the plurality of NF types.

12. The system of claim 8 wherein the single discovery request message further includes a plurality of search attributes.

13. The system of claim 12 wherein the plurality of search attributes define at least one of a target public land mobile network (PLMN), a target network slice, or a preferred locality.

14. The system of claim 8 wherein the indication of multiple NF discovery requests is included in a search uniform resource identifier (URI) portion of the single discovery request message.

15. A non-transitory computer readable medium having stored thereon executable instructions that when executed by a processor of a computer control the computer to perform steps comprising:
 receiving, by a network function repository function (NRF) from a consumer network function (NF), a single discovery request message that requests discovery of a plurality of producer NF types in a fifth generation (5G) core network and includes an indication of multiple NF discovery requests;
 obtaining, by the NRF, NF profile objects corresponding to each of the plurality of producer NF types included in the single discovery request message; and
 providing, to the consumer NF via a single discovery response message generated by the NRF, NF profile objects that correspond to one or more of the plurality of producer NF types.

16. The non-transitory computer readable medium of claim 15 wherein the single discovery response message includes an indication of multiple NF discovery responses.

17. The non-transitory computer readable medium of claim 15 wherein the indication includes a listing of the plurality of NF types in a custom header of the single discovery request message.

18. The non-transitory computer readable medium of claim 15 wherein the single discovery request message includes a search uniform resource identifier (URI) portion that contains a listing of the plurality of NF types.

19. The non-transitory computer readable medium of claim 15 wherein the single discovery request message further includes a plurality of search attributes.

20. The non-transitory computer readable medium of claim 19 wherein the plurality of search attributes define at least one of a target public land mobile network (PLMN), a target network slice, or a preferred locality.

\* \* \* \* \*